United States Patent
Bi et al.

(10) Patent No.: US 7,746,779 B2
(45) Date of Patent: Jun. 29, 2010

(54) METHOD AND APPARATUS FOR SCHEDULING USERS TO ALLOCATE DATA TRANSMISSIONS IN COMMUNICATIONS SYSTEMS

(75) Inventors: Qi Bi, Morris Plains, NJ (US); Ching Yao Huang, Randolph, NJ (US); Pi-Chun Chen, Lake Hiawatha, NJ (US); Patrick Li, Mendham, NJ (US); Stanley Vitebsky, Parsippany, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1314 days.

(21) Appl. No.: 10/300,891

(22) Filed: Nov. 21, 2002

(65) Prior Publication Data

US 2003/0223429 A1    Dec. 4, 2003

(51) Int. Cl.
*G08C 15/00* (2006.01)
(52) U.S. Cl. .................... 370/232; 370/252; 370/329; 370/433
(58) Field of Classification Search .......... 370/232, 370/233, 234, 252, 329, 433
See application file for complete search history.

(56) References Cited

U.S. PATENT DOCUMENTS

| 5,485,147 | A | 1/1996 | Jaffe et al. | |
|---|---|---|---|---|
| 6,393,012 | B1 * | 5/2002 | Pankaj | 370/342 |
| 6,788,687 | B2 * | 9/2004 | Bao et al. | 370/394 |
| 6,807,426 | B2 * | 10/2004 | Pankaj | 455/453 |
| 2002/0183084 | A1 * | 12/2002 | Wu et al. | 455/509 |
| 2003/0039213 | A1 * | 2/2003 | Holtzman et al. | 370/252 |

OTHER PUBLICATIONS

Jong Hun Rhee et al., "A wireless fair scheduling algorithm for 1xEV-DO system", *VTC Fall 2001, IEEE 54th, Vehicular Technology Conference*, vol. 1, Oct. 2001, pp. 743-746.
Kuenyoung Kim et al., "A proportionally fair scheduling algorithm with QoS and priority in 1XEV-DO", *School of Communication Engineering*, vol. 5, Sep. 2002, pp. 2239-2243.
European Search Report (dated Oct. 8, 2003).

* cited by examiner

*Primary Examiner*—Jayanti K Patel
*Assistant Examiner*—Bo Hui A Zhu
(74) *Attorney, Agent, or Firm*—Harness, Dickey & Pierce

(57) ABSTRACT

In the method, scheduling of a plurality of users for receiving transmitted data is prioritized within a communications system. A next data transmission among the plurality of users is allocated based on the prioritized scheduling.

38 Claims, 11 Drawing Sheets

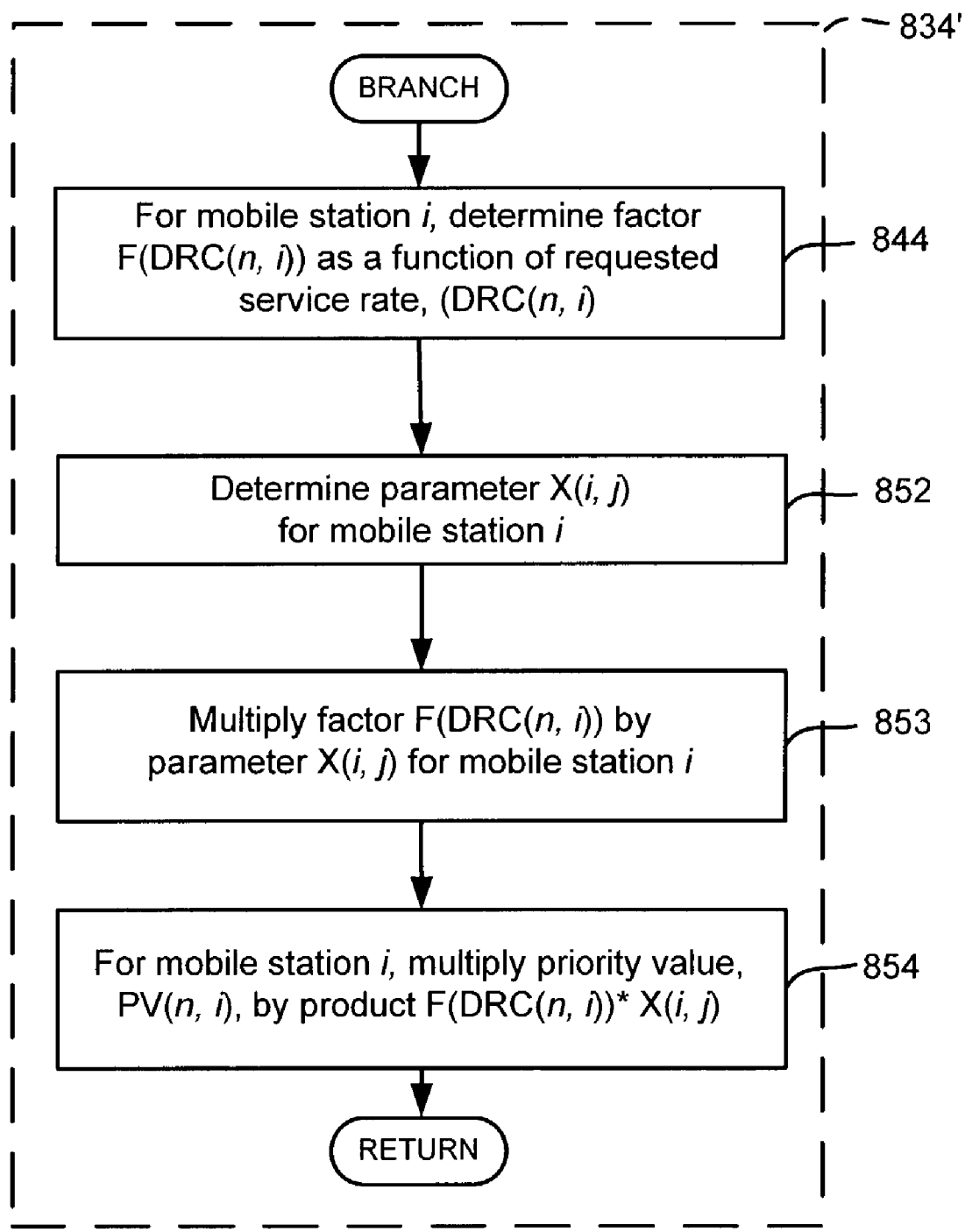

METHOD AND APPARATUS FOR SCHEDULING USERS TO ALLOCATE DATA TRANSMISSIONS IN COMMUNICATIONS SYSTEMS

CONTINUATION INFORMATION

This application claims domestic priority benefits under 35 U.S.C. §120 to the following co-pending U.S. patent applications: U.S. application Ser. No. 10/161,182 to Stanley VITEBSKY, filed Jun. 3, 2002 and entitled "Wireless Communications System and Related Methods for Allocating Data Transmission"; and U.S. application Ser. No. 10/160,125 to Qi BI et al., filed Jun. 4, 2002 and entitled "Scheduler Method and Apparatus for Communication Systems". The contents of each of the above co-pending applications are incorporated by reference in their entirety herein.

BACKGROUND OF THE INVENTION

1. Field of the Invention

The present invention relates generally to next generation wireless communication systems; and more particularly, to scheduling users in communication systems for allocating transmitted data to these users.

2. Description of Related Art

New technical challenges emerge as telecommunication systems evolve from a second generation system offering pure voice services, to a third generation system providing mixed voice and data services. In meeting data service demands, new performance metrics and algorithms need to be defined in order to optimize data performance.

CDMA 3G-1x Evolution Data Only (1xEVDO or known as High Data Rate) system is an evolution system of cdma2000 3G-1x system, and is a pure data system to provide data services to mobile users. In 1xEVDO, a scheduler or scheduling function is provided in a base station controller in order to provide fast scheduling or management of system resources based on channel quality feedback from one or more mobiles. In general, a scheduler selects a mobile for transmission at a given time instant, and adaptive modulation and coding allows selection of the appropriate transport format (modulation and coding) for the current channel conditions seen by the mobile.

In second generation wireless communications systems such as those of the IS-95 standard, applications typically employ voice-based communication schemes, in which a connection between the base station and the mobile is a dedicated connection. Since these are essentially fixed connections, there is no need for prioritizing the order of transmission to the active users served by the system (an active user is a user with data to transmit at a current time instant). However, with the emergence of third generation wireless data communications systems, such as CDMA-2000 standard systems and 1xEVDO, management of system resources is paramount. This is because properties of data differ significantly from properties of voice. For example, a data transmission, unlike a voice transmission, is not necessarily continuous and may be embodied as a burst transmission or an intermittent-type transmission between a base station and a mobile, for example. Accordingly, a base station in a third-generation system will attempt to manage a large pool of data users by assigning radio resources to each user for transmission. Typically this is done utilizing a prioritization scheme controlled by a scheduler in the base station controller. In a conventional prioritization scheme, idle mobile's are assigned a lower priority than mobile with data to transmit.

Accordingly, the scheduler must be able to manage these large numbers of users without wasting radio resources of the communication system. This management function becomes even more important as a base station attempts to meet QoS (Quality of Service) requirements. QoS is a general term that may represent a number of different requirements. As a basic tenant, QoS is indicative of providing guaranteed performance (e.g., such as a minimum/maximum data network throughput, a minimum delay requirement, a packet loss rate, and a packet download time, etc.) in a wireless communications system.

Presently, several scheduler algorithms have been proposed. One algorithm is termed a proportional fair (PF) scheduler algorithm. The principal of the PF algorithm is to schedule users for transmission with a maximum data rate channel (DRC) requested-to-average throughput ratio, which is also referred to as the priority weight of each user. In telecommunications, throughput means bits of information received per second. A user perceived throughput in the system is defined as the average information bits received by a user per second. In mathematical form, this ratio may be expressed by the following expression:

$$\max_i \frac{DRC_i(n)}{R_i(n)}, \quad (1)$$

$$\text{where } R_i(n) = \left(1 - \frac{1}{T}\right) R_i(n-1) + \frac{1}{T} DRC_i^{assigned}(n).$$

In expression (1), $DRC_i(n)$ is the DRC value requested by user i at time instant n. $DRC_i^{assigned}$ is the DRC value assigned to user i at time instant n. $R_i(n)$ is the i-th user throughput averaged by an IIR filter with time constant T. The time constant T is a time scale over which the average throughput is measured. The fairness principal is also based on time constant T. The choice of T should be sufficiently large to smooth out fluctuations of fading channels, and to represent an average channel condition perceived by a user, but not too large to meet or exceed packet delay requirements.

The PF algorithm explores a multiplexing gain from multiple users, and at the same time serves users in what is called a "proportional fair" sense. The PF algorithm tends to equalize the $DRC_i(n)/R_i(n)$ ratio among users. As a result, the average user throughput will be "proportional to" the DRC rate a user has requested, or $R_i \propto DRC_i$. In other words, a user having a good channel condition will achieve a good throughput, and for a user with poor channel condition, a poor throughput. Moreover, the PF algorithm is a generic algorithm which does not take care of QoS requirements that may be imposed by the system. Additionally, the PF algorithm requires much guess work and is not fully implemented for user diversity.

Another algorithm, called a generalized proportional fairness algorithm or G-Fair algorithm, is a generalized version of the PF algorithm that has been created to further explore user diversity. The algorithm may be defined by the following expression;

$$\max_i \frac{DRC_i(n)}{R_i(n)} * \frac{h(DRC_i^{avg})}{DRC_i^{avg}} \quad (2)$$

where $DRC_i(n)$, $$DRC_i^{assigned}(n),$$

and $R_i(n)$ have the same definitions as stated in Equation (1); and where $$DRC_i^{avg}(n)$$

is the averaged DRC value of user i at time instant n, and is updated using the following expression:

$$DRC_i^{avg}(n) = \left(1 - \frac{1}{T}\right)DRC_i^{avg}(n-1) + \frac{1}{T}DRC_i^{assigned}(n). \quad (3)$$

The priority weight computation in the G-Fair algorithm differs from the PF algorithm by multiplying the original weighting value with a function $h(DRC_i^{avg})/DRC_i^{avg}$. There are five different variations of function $h(\ )$, which lead to five different options for G-Fair algorithms:

Option 0: $h(DRC_i^{avg}) = DRC_i^{avg}$;

Option 1: $h(DRC_i^{avg}) = 2 * DRC_i^{avg}$;

Option 2: $h(DRC_i^{avg}) = 4 * DRC_i^{avg}$;

Option 3: $h(DRC_i^{avg}) = 1$;

Option 4: $h(DRC_i^{avg}) = \min(c * DRC_i^{avg}, d)$.

In Options 0-4, $$DRC_i^{avg}$$

is the average DRC value in units of 150 bps of the i-th user, c is a constant, and d is a constant with a valid range between 256-16384. The constant c maybe set to 1 to simplify the above expression (3). Option 0, Option 1 and Option 2, though each in a different form, all lead to a PF algorithm in terms of their performance because all users' priorities are scaled by the same fixed constant and the order of priorities remain unchanged. In Option 3, where $h(\ )=1$, the constant "1" on the right hand side of the expression may be replaced by other constants without affecting the performance of Option 3. The scheduling principle in Option 3 is different from the scheduling principles of the PF algorithm. Instead of providing a user throughput that is proportional to a user's requests, as suggested by the PF algorithm, Option 3 provides a user throughput that is proportional to the variation of a user's requests over time.

Option 4 is a generalized form of the G-Fair algorithm. Option 4 will degenerate into Option 3 with a small d value, and become Options 0, 1, and 2 with a large d value. The performance of Option 4 is dictated by the ratio of the two parameters, constant c and constant d, but not their absolute values. For instance, in comparing a situation where {c=1, d=256} and a situation where {c=2, d=512} each result in the same performance. To further simplify the expression (3), the parameter c is normalized to equal one (c=1). Since Option 4 encompasses other options of the G-Fair algorithm, the following discussion focuses primarily on Option 4 of the G-Fair algorithm.

FIG. 1 illustrates performance of a conventional scheduler algorithm. Specifically, the h-function of Option 4 of the G-Fair algorithm consists of two fragments of straight lines, as illustrated in FIG. 1. For $$DRC_i^{avg}$$

values less than d, the weight computation in equation (2) reduces to equation (1) of PF algorithm. For $DRC_i^{avg}$ values greater than d, $$h(DRC_i^{avg})$$

values is capped at d, and the weight computed in equation (2) will be a smaller value than as computed in PF algorithm. This behavior of h-function provides a control mechanism to discourage users with high $$DRC_i^{avg},$$

so as to benefit a user having a poor $$DRC_i^{avg}.$$

With a properly chosen d value, the dynamic ranges of user perceived throughputs, the distance range between the minimum and the maximum throughputs, can be adjusted as well.

The performance of the G-Fair algorithm was simulated based on the assumptions listed in Table 1. For the stimulation, 20 simultaneous active mobiles at 3 kmph with full buffer data to transmit where evaluated. Three propagation channel conditions were simulated, including additive white gaussian noise (AWGN), 1-path Rayleigh fading and 2-path Rayleigh fading. The values of parameter d in the h-function were chosen as multiples of 256, such that the corresponding physical channel rates were multiples of 38.4 kbps.

TABLE 1

G-Fair Algorithm Simulation Assumptions.

| | |
|---|---|
| Number of mobiles | 20 |
| mobile Speed | 3 kmph |
| Propagation Channels | AWGN, 1-path, 2-path |
| Traffic Model | Full Buffer Transmission |
| IIR Filter Time Const T | 1024 |
| h-function Parameter d | 256 (38.4 kbps), |
| | 512 (76.8 kbps), |
| | 1024 (153.6 kbps), |
| | 2048 (307.2 kbps), |
| | 4096 (614.4 kbps), |
| | 8192 (1.2 Mbps), |
| | 16384 (2.4 Mbps) |

FIG. 2 illustrates the performance of the conventional scheduler algorithm of FIG. 1 for different user throughputs. Specifically, FIG. 2 illustrates the performance of the G-Fair algorithm in terms of user throughputs and sector throughputs. A user throughput characterizes the user-perceived channel rate, and is embodied as a ratio of the total successfully received bits by a user on a physical to the session active time. The sector throughput is the aggregate channel rate per sector. A coverage area served by one BS is called a cell; within a cell, there might be multiple sectors. The typical configuration is to have three sectors in one cell. The sector throughput is computed as the ratio of the total good physical channel transmitted bits to the simulation time.

A standard deviation of user throughput can be considered a measure of "fairness". As shown in FIG. 2, as the value of parameter d varies between 256 to 16384, the standard deviation of user throughput ranges from about 0 to 45 kbps, and the sector throughput ranges from about 400 to 1000 kbps. The standard deviation of the user throughout decreases as the value of parameter d decreases. A small value of d can be used to provide uniform user throughput independent of different channel conditions of individual users. However, the tradeoff to reducing d results in a reduced sector throughput, because the scheduler does not fully explore good channel conditions seen by some users. The scheduler treats all users as if they had the same channel conditions. However, by properly choosing parameter d, a certain degree of fairness may be achieved, albeit with a compromised sector throughput.

The G-Fair algorithm, much as the PF algorithm, is a generic algorithm which would require extensive modification as more requirements are imposed on the wireless system, such as the aforementioned QoS requirements. For instance, in order to impose minimum or maximum rate QoS requirements, the scheduler needs to define an objective variable that is a function of QoS variables. There is no mechanism in presently proposed scheduler algorithm(s) that enable the scheduler to handle the increasing QoS requirements of third generation wireless systems.

Moreover, even though the G-Fair algorithm, much as the PF algorithm, attempts to allocate communication resources among multiple users more fairly than would a simple first-come-first-served queuing algorithm, such allocations, however, do not provide providers of wireless communication services with sufficient control over data transmission to meet all service provider requirements (QoS requirements). There remains, for example, a problem of constraining the data throughput of those users that put excessive demands on a wireless communications network. There is also the problem of differentiating among users on the basis of the nature of the application for which each user is utilizing the network. Further, there is the problem of differentiating among network users on the basis of individual users' payment plans. Thus, conventional schemes for allocating the transmission of data do not adequately address these and other service provider requirements.

SUMMARY OF THE INVENTION

There is described a method and apparatus of scheduling a plurality of users so as to allocate transmitted data to the users within a communication system. The method and apparatus prioritize the scheduling of the plurality of users for receiving transmitted data, and allocate a next data transmission among the plurality of users based on the prioritized scheduling.

BRIEF DESCRIPTION OF THE DRAWINGS

The present invention will become more fully understood from the detailed description given hereinbelow and the accompanying drawings, wherein like elements are represented by like reference numerals and prime and multiple prime notation indicates similar elements in alternate embodiments, which are given by way of illustration only and thus are not limitative of the present invention and wherein:

FIG. 11A is a flow chart is a flow chart of steps in accordance with yet a further alternate embodiment of a portion of the flow chart of FIG. 8;

DETAILED DESCRIPTION

Figure 1:
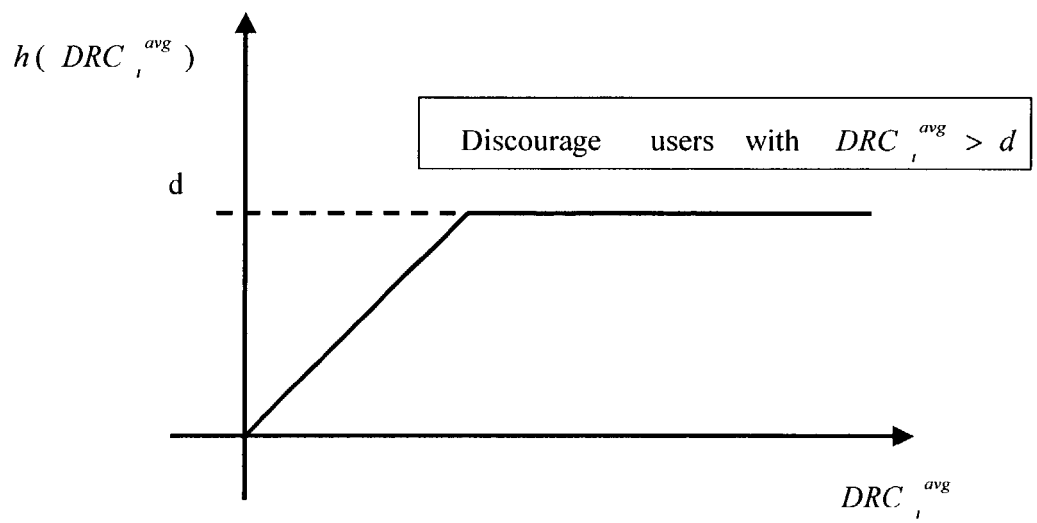
FIG. 1 illustrates performance of a prior art scheduler algorithm.
Figure 2:
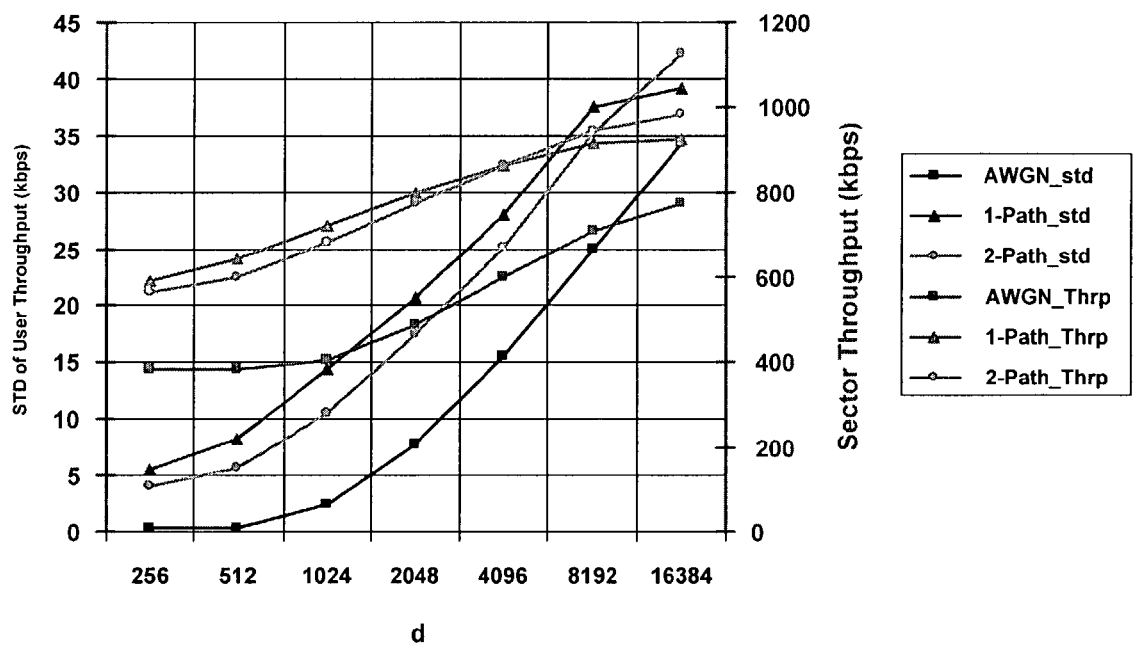
FIG. 2 illustrates performance of the prior art scheduler algorithm of FIG. 1 for different user throughputs.

Although the principles of the invention are particularly well-suited for wireless communications systems based on the well-known High Speed Downlink Packet Access (HSDPA) specification in the Universal Mobile Telecommunication System (UMTS) standard, and may be described in this exemplary context, it should be noted that the embodiments shown and described herein are meant to be illustrative only and not limiting in any way. As such, various modifications will be apparent to those skilled in the art for application to other transmission systems and are contemplated by the teachings herein. Additionally where used below, the terms user and user equipment (UE) are synonymous to a mobile station (also occasionally referred to herein as a remote station) in a communications system such as a wireless network, and the terms base station and Node-B may be used interchangeably.

In one exemplary embodiment, an average user throughout for all active users in the system is computed, and each user's actual throughput is compared against the computed average throughout. Based on the comparison, the scheduling of the plurality of users (e.g, scheduling order in which users receive data transmissions) is prioritized.

In an aspect of this embodiment, a priority adjustment factor, to be applied to each user, is determined in order to prioritize the scheduling of the plurality of users. The priority adjustment factor may be determined based in part on an update function. The update function is proportional to a calculated difference between a user's actual throughput and the computed average user throughput for all active users. Based on the sign for the update function, each of the plurality of users may be prioritized by an apparatus such as a scheduler within a base station. The priority adjustment factor is either incremented or decremented based on the sign of the update function. The scheduler may output priority information that informs the base station to allocate and transmit data in a current time slot to the user determined as the highest priority user.

In another embodiment, there is described a method of scheduling a plurality of users to receive transmitted data, where an average user throughput over all active users is computed, and where a function result for each user is calculated based on the computed average user throughput and based on a user perceived throughput of each user. Scheduling of users for receiving transmitted data is prioritized based on the function result.

An apparatus invoking the methods in the above exemplary embodiments may be a controller within a base station, for example, and more particularly a scheduler which is part of a base station controller. Where used herein, the terms controller, base station controller and scheduler may be used interchangeably, as they may refer to an exemplary apparatus for scheduling users to receive data transmissions within a communication system. As will be seen in more detail hereafter, the apparatus may include a filter for computing an average user throughput over all active users, and a prioritizer for prioritizing the scheduling of the plurality of users for receiving transmitted data based on an average user throughput over all active users.

Where used herein, the phrases "average service rate" and "average user throughput" are synonymous. Additionally, the phrase "requested data rate" may also be occasionally referred to as a "data rate request" and a "requested service rate". Further, the phrase "priority adjustment factor" may also be referred to as a "priority value" in order to describe how priority is assigned to each user.

In a further exemplary embodiment, there is described a method of scheduling a plurality of users for allocating transmitted data to the users within a communication system. In the method, an apparatus such as a base station controller or scheduler within a base station, for example, determines an average service rate for each user, and determines a priority value for each user that may be based upon both a requested service rate of the user and the average service rate of the user. The controller may modify at least one of the average service rate and the priority value for at least one of the users in order to control an allocation of transmitted data to the users.

In yet another exemplary embodiment, there is described a method of scheduling a plurality of users for allocating transmitted data to the users, in which a average service rate for each of the plurality of users is modified. The modified average service rate may be based upon an average service rate of one of the users. Based on both the modified average service rate and on a requested service rate of the user, a priority value for the user is determined. A next transmission of data may be allocated to a user having a highest priority value.

In still a further exemplary embodiment, an average service rate for each of the plurality of users may be determined, and may be compared against a threshold. Based on the comparison, the eligibility of a user for allocation of a next transmission of data (e.g., eligibility to receive transmitted data) is determined.

Figure 3:
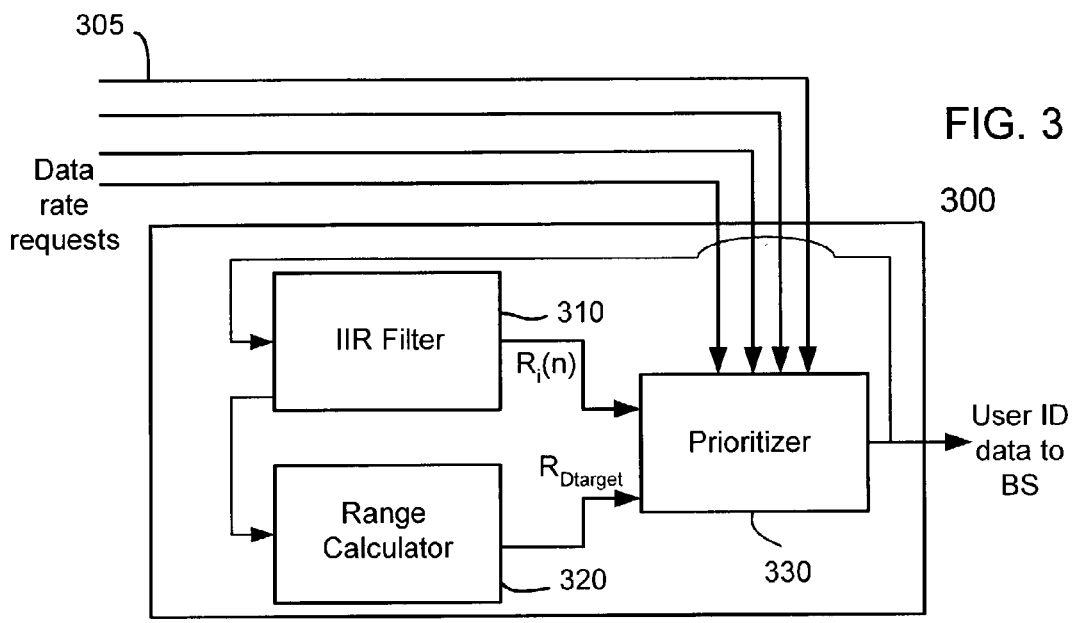
FIG. 3 illustrates a block diagram of an apparatus in accordance with an exemplary embodiment of the invention.

FIG. 3 illustrates a block diagram of an apparatus in accordance with the invention. As illustrated in FIG. 3, a base station controller (not shown) includes a scheduler 300. As inputs to the scheduler 300, a plurality of active users send data rate requests over data rate channels (DRC's) 305. The values transmitted by a user over a DRC 305 are indicative of the requested rate of that user. The plurality of requested data rates may be received by an IIR (Infinite Impulse Response) filter 310, which assimilates the requested data rates over all active users and computes an average user throughput for all active users.

Additionally, each data rate request may be input to a range calculator 320. The range calculator 320 calculates an average user throughput, which is also referred to as the dynamic target rate $R_{Dtarget}$, based on user perceived throughputs updated by IIR filter 310. The average user throughput for all users and the maximum and minimum user throughput results are then forwarded to a prioritizer 330. As will be described in further detail below, prioritizer 330 may perform a number of functions including, but not limited to, comparing the user perceived throughput of each user with the computed average user throughput, in order to determine priority of data transmission for scheduling each of the active users. As part of determining the priority for each user, the prioritizer 330 may apply a priority adjustment factor that is based on an update function. The update function ( the output of which are updates to the scheduling algorithm) is proportional to the calculated difference between a user's actual throughput and the average user throughput. Accordingly, prioritizer 330 assigns the priorities to each user based on the priority adjustment factor applied to each user, which is a function of the update function calculated for each user. The prioritizer 330 may output priority information that informs the base station to transmit data in a current time slot (e.g., to allocate a certain next transmission of data) to a user identified as the highest priority user.

Figure 4:
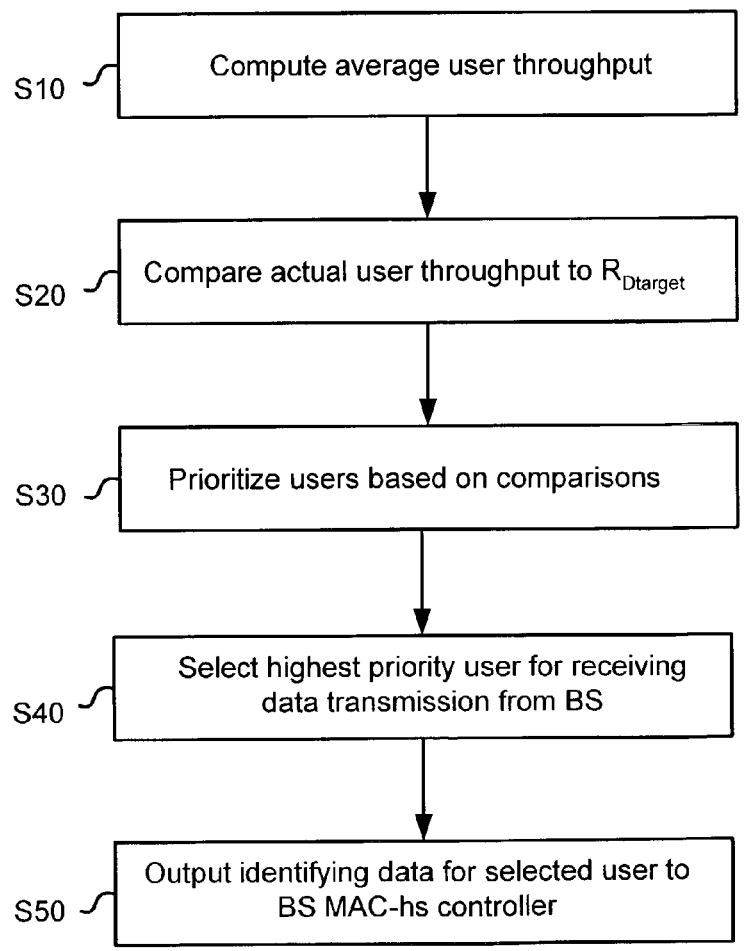
FIG. 4 illustrates a method in accordance with an exemplary embodiment of the invention.

FIG. 4 illustrates a method in accordance with an exemplary embodiment the invention. Referring to FIG. 4, at every time instant, scheduler 300 computes an average user throughput over all active users (Step S10). Since the average user throughput changes over time, this quantity may be referred to as a dynamic target user throughput, or $R_{Dtarget}$. In Step S20, scheduling of the users is prioritized by comparing each user perceived throughput for each user to the computed $R_{Dtarget}$. In particular, this comparison includes calculating a difference between each user's perceived throughput and the $R_{Dtarget}$.

More particularly, an update function, $(F_i^d(n))$ which is a function of the maximum user throughput, $R_{max}$, the minimum user throughput, $R_{min}$, and the average user throughput, $R_{Dtarget}$, at each time instant n, is determined. As will be illustrated by the expressions in further detail below, $F_i^d(n)$ is proportional to the difference between a user's user perceived throughput and $R_{Dtarget}$.

Based on the comparison in step S20, the scheduler 300 prioritizes (Step S30) the scheduling for all active users. As will be evident by the expressions discussed below, this prioritization is performed based on applying a priority adjustment factor, $F_i(n)$, to the scheduler algorithm to assign priority for each user. The priority adjustment factor is calculated based on the update function determined at each time instant for each user. Once each user has been prioritized, the highest priority user is selected by prioritizer 330 (Step S40), and prioritizer 330 outputs identifying information for that highest priority user (Step S50) which informs the base station to transmit data (allocate a next transmission of data) in the current time slot to that user.

Motivated by QoS requirements, the scheduler and scheduling method in accordance with the invention has been developed to provide fairness, as well as to place maximum and minimum constraints on user throughputs, while maintaining a sufficient sector throughput, the information bits per second received by users in a sector, for the wireless network or system. The scheduler algorithm may be adapted so that all user perceived throughputs lie within an operating range between $R_{min}$ and $R_{max}$. Additionally, the scheduler algorithm introduces four additional parameters, $F_i(n)$, $F_i^d(n)$, $R_{max}$ and $R_{min}$, as have been briefly described above. Accordingly, the scheduler algorithm may be defined by the following expressions $$\max_i \frac{DRC_i(n)}{R_i(n)} * F_i(n) \quad (4)$$

Where $F_i(n) = F_i(n-1) + \frac{F_i^d(n)}{M}$, and when $F_i^d(n) = \begin{cases} -e^{(R_i(n)-R_{max})}, & R_{max} < R_i(n) \\ -(R_i(n) - R_{Dtarget}), & R_{Dtarget} < R_i(n) < R_{max} \\ -(R_i(n) - R_{Dtarget}), & R_{min} < R_i(n) < R_{Dtarget} \\ e^{(R_{min}-R_i(n))}, & R_i(n) < R_{min} \end{cases}$, and where $R_{Dtarget}(n) = \frac{\sum_i R_i(n)}{N}$.

In expression (4), $DRC_i(n)$ and $R_i(n)$ are the same as defined in expression (1). $F_i(n)$ is a priority adjustment factor in weight computation of a user i, and is updated with an update function $F_i^d(n)$. $R_{max}$ and $R_{min}$ represent the maximum and minimum user throughputs, as described above, at each time instant n. M is a constant used for incrementing the priority adjustment factor; and N is the number of active users at a given time instant in the system.

Figure 5:
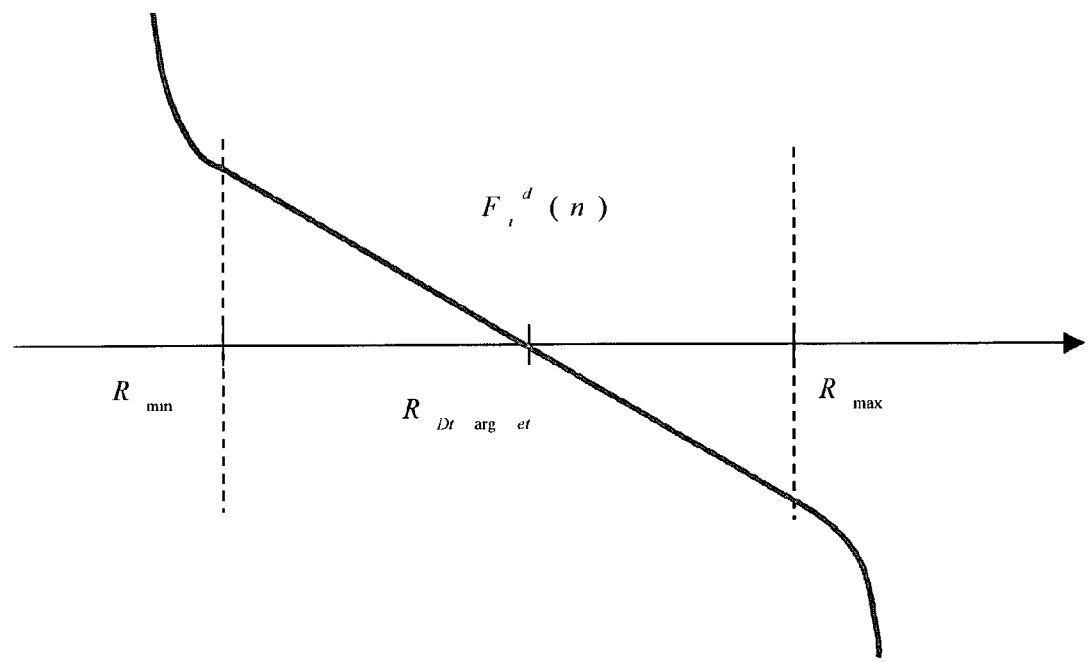
FIG. 5 illustrates behavior of an update function in accordance with an exemplary embodiment of the invention.

The behavior of the update function $F_i^d(n)$ is illustrated with respect to FIG. 5. Referring to FIG. 5, for a user whose user perceived throughput lies between $R_{min}$ and $R_{max}$, the update function is proportional to the difference between the user's perceived throughput and the average user throughput for all active users ($R_{Dtarget}$). Accordingly, the sign of the update function is positive for users whose user throughput is greater than $R_{Dtarget}$. The sign is negative for users whose throughput is less than $R_{Dtarget}$.

For active users whose user throughputs fall outside the operating range, the update function is an exponential function of the difference between user perceived throughput and either $R_{min}$ or $R_{max}$. Accordingly, as shown in FIG. 5 in this scenario the sign of the update function will be positive for users whose user perceived throughput are greater than $R_{max}$ and negative for users whose user perceived throughput are less than $R_{min}$. Utilizing these properties, the prioritizer 330 is able to increment or decrement the priority adjustment factor accordingly, and assign the higher priority to users whose user perceived throughput is less than $R_{min}$, and the lower priority to users whose user throughput is greater than $R_{max}$. The user with the highest priority will be the user with the maximum $DRC_i(n)/R_i(n)*F_i(n)$ as expressed in expression (4).

Figure 6:
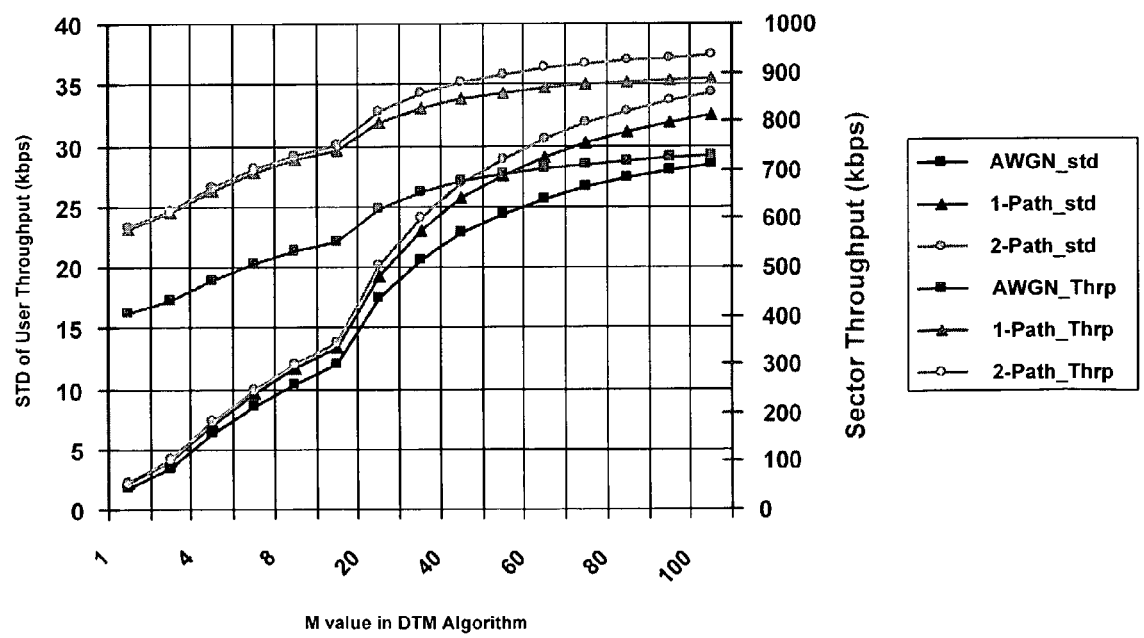
FIG. 6 illustrates performance of the method described in FIG. 4 for different user throughputs.

FIG. 6 illustrates performance of the scheduling method in accordance with the invention for different user throughputs. To study the performance of the scheduler algorithm, simulations were conducted under the following assumption in Table 2.

TABLE 2

DTM Algorithm Simulation Assumptions.

| | |
|---|---|
| Number of mobiles | 20 |
| Mobile Speed | 3 kmph |
| Propagation Channels | AWGN, 1-path Rayleigh, 2-path Rayleigh |
| Traffic Model | Full Buffer Traffic Model |
| IIR Filter Time Const T | 1024 |
| Rmin | 9.6 kbps |
| Rmax | 1 Mbps |
| Initial Value of F(n) | 1000 |
| Const M in F(n) update | integers from 1 to 100 |

The simulation assumptions in Table 2 are similar to those described earlier with respect to the G-fair algorithm, with the exception that an operating range has been added with a lower end $R_{min}$ of 9.6 kbps and an upper end being set at $R_{max}$ of 1 Mbps. The initial value of the priority adjustment factor was set to 1000, and the constant M varies as a system parameter from 1 to 100. As illustrated in FIG. 6, sector throughput ranges from about 400 kbps to 1000 kbps, and the standard deviation of user throughput increases as constant M increases. In other words, smaller values of M will have a tighter control over the variations of user throughput as designed by the update values generated by the update function.

The scheduler may provide controls on the minimum and the maximum user perceived throughputs in order to meet certain delay requirements. In addition, the scheduler may also provide tighter control on variations in user throughput, which can be explored in order to achieve a user defined fairness that is not limiting to the proportional fairness of the existing algorithms.

Figure 7:
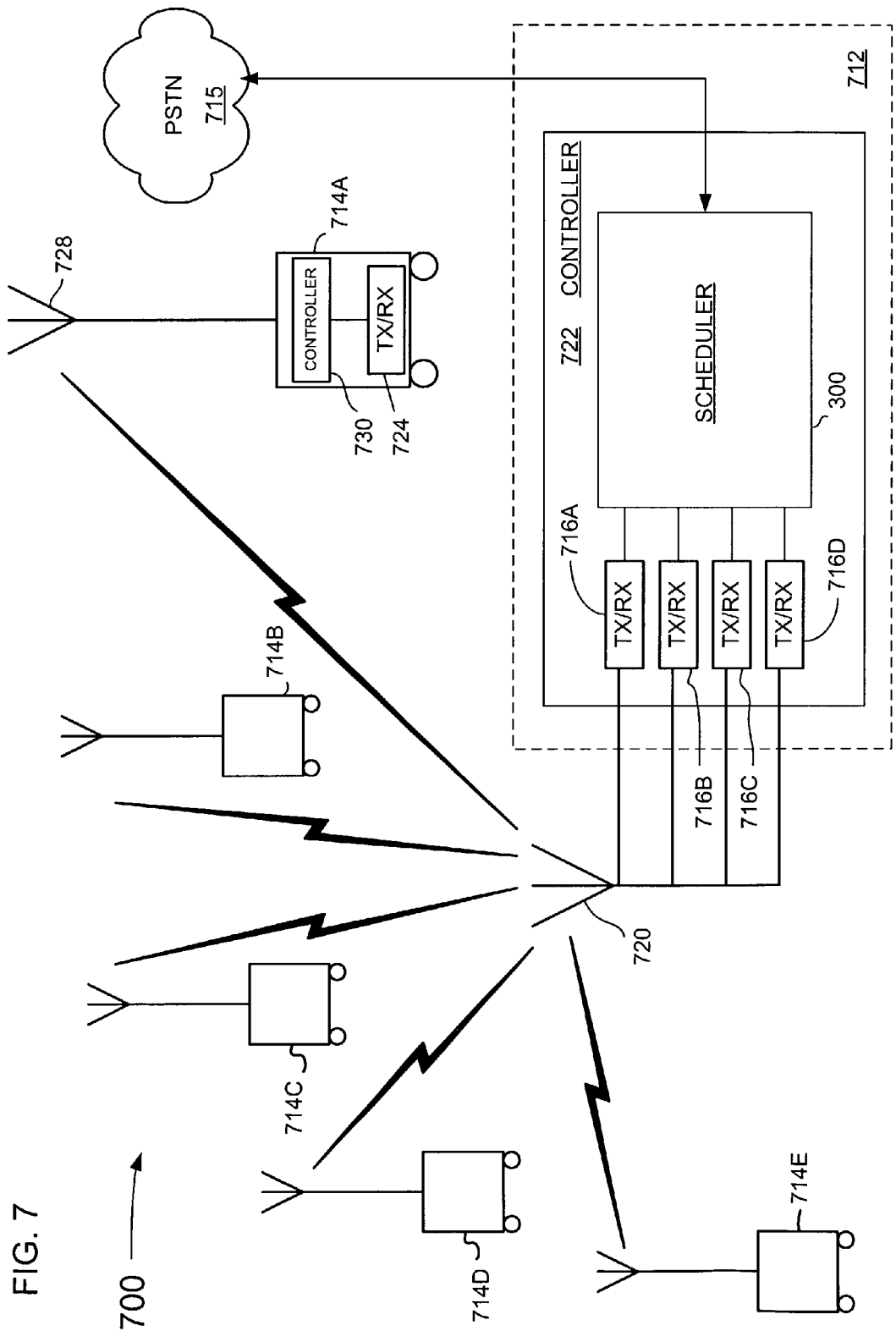
FIG. 7 is a schematic block diagram of a communication system in accordance with another exemplary embodiment of the invention.

FIG. 7 is a schematic block diagram of a communication system in accordance with another exemplary embodiment of the invention. Referring to FIG. 7, a communications system 700 according to an exemplary embodiment is described. The communications system 700 may include a base station 712 and a plurality of remote stations (users), referred to hereafter as mobile stations 714A-714E, each of which communicates wirelessly with the base station 712. The base station 712, moreover, also may illustratively communicate with a public switched telephone network (PSTN) 715, for example.

The base station 712 illustratively comprises a plurality of transceivers 716A-716D, an antenna 720 connected to each transceiver, and a controller 722 connected with and controlling each of the transceivers 716A-716D. The controller 722 may include a scheduler 300, such as is described with respect to FIG. 3, for example. The mobile stations 714A-714E are identical or substantially similar to one another. It suffices, therefore, to describe a single mobile station 714A, which illustratively comprises a transceiver 724, an antenna 728 connected thereto, and a controller 730 also connected to the transceiver.

Each of the plurality of mobile stations 714A-714E communicates with the base station 712 and transmits thereto a requested service rate (e.g., data rate request) DRC(n, i), n representing the n-th time slot for a transmission of data and i indicating the mobile station transmitting the requested service rate. The base station 712 allocates a next transmission of data in the n-th time slot. The allocation may be made according to a scheduling operation that may prioritize the plurality of mobile station 714A-714E, so as to provide enhanced throughput control when implemented by the controller 722.

Figure 8:
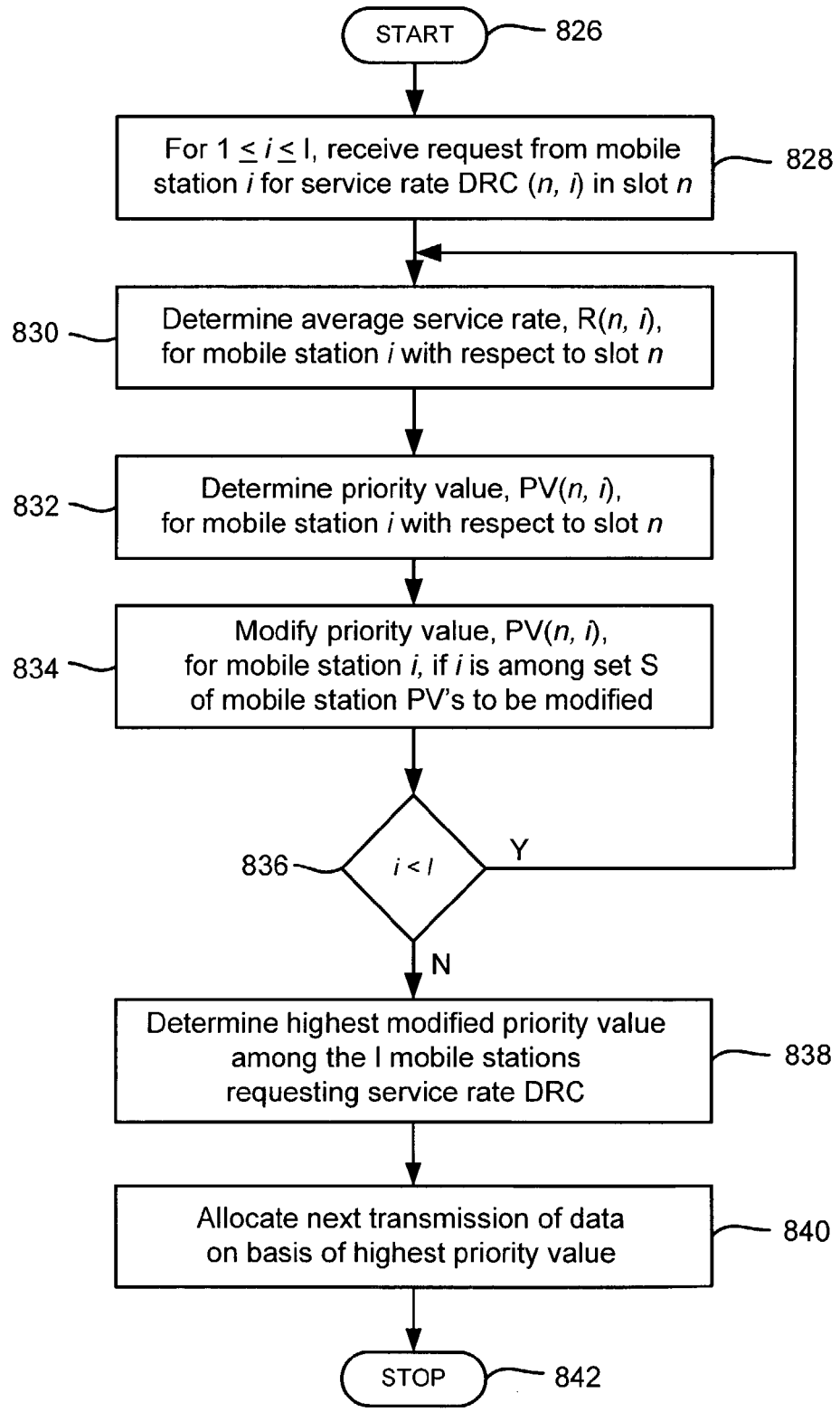
FIG. 8 is a flow chart illustrating a method in accordance with another exemplary embodiment of the invention.

FIG. 8 is a flow chart illustrating a method in accordance with another exemplary embodiment of the invention. A scheduling operation is illustrated by flow chart 824. After the start (Block 826), at least one mobile station 714A-714E transmits a requested service rate that is received by the base station 712 at Block 828. An average service rate R(n, i) is determined at Block 830 for the i-th mobile station with respect to the n-th slot (i.e., the time slot to be allocated for the next transmission of data). On the basis the requested service rate, DRC(n, i), and the average service rate R(n, i), a priority value PV(n, i) (e.g., priority adjustment factor) is determined for the i-th mobile station (Block 834) for the n-th slot.

To enhance throughput control, the priority value of at least one of the mobile stations 714A-714E may be modified. Accordingly, for the i-th mobile station, the priority value, PV(n, i), is modified at Block 834 if the i-th mobile station is among a set S of at least one mobile station whose priority value is to be modified. The steps are repeated at Block 836 for each mobile station transmitting a requested service rate to the base station 712. Therefore, the priority value of at least one of the mobile stations 714A-714E may be modified.

For each mobile station 714A-714E, a determination as to which mobile station has the highest priority value is made at Block 838. The next transmission of data is allocated on the basis of the highest priority value as determined according to the scheduling operation (Block 840), upon which the scheduling operation is completed at Block 842.

Figure 9:
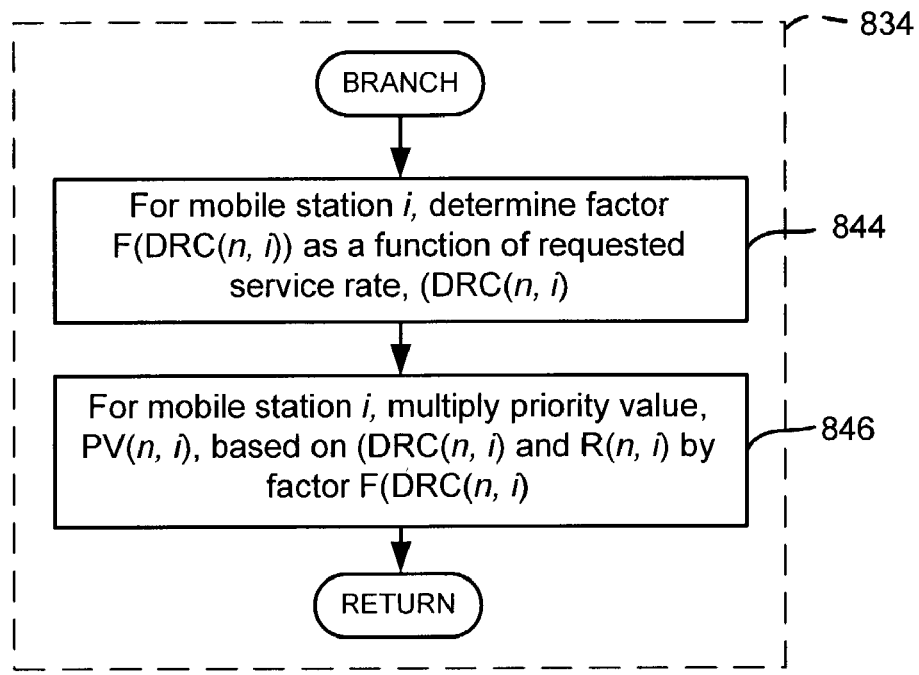
FIG. 9 is a flow chart of steps in accordance with an alternate embodiment of a portion of the flow chart of FIG. 8.

FIG. 9 is a flow chart of steps in accordance with an alternate embodiment of a portion of the flow chart of FIG. 8. Referring now to FIG. 9, one embodiment of the system's modifying the priority value PV(n, i) at Block 834 of flow chart 824 in FIG. 8 is described. According to this embodiment, a priority value for the i-th mobile station is modified on the basis of the requested service rate, DRC(n, i), of the i-th mobile station. Modifying the priority value PV(n, i) may include determining, at Block 844, a factor, F(DRC(n, i)), which is a function of the requested service rate, DRC(n, i). The priority value, PV(n, i), is itself based on the requested service rate, DRC(n, i) as well as an average service rate R(n, i) of the i-th mobile station (e.g., the average service rate is the average user throughput of expression (1), expressed here as DRC(n, i)/R(n, i)).

At Block 846, the priority value PV(n, i) is modified by multiplying the priority value by the factor F(DRC(n, i)). This provides a direct and efficient way of modifying the priority value based on the requested service rate. For example, if the factor varies inversely to the requested service rate (e.g., [dF(DRC(n, i))]/dDRC(n, i)]<0 if F is continuous), then a result of the modification may be to dampen the effect of a high requested service rate and to enhance the effect of a low requested service rate.

As will be readily apparent to those skilled in the art, there are other multiplication factors based either on continuous or discrete functions that alternately can be used to raise or lower the priority value. Moreover, as will also be readily appreciated by those skilled in the art, the system 700 alternately can employ one or more factors stored, for example, in a look-up table, to raise or lower a priority value according to whether the requested service rate of the i-th mobile station is lower or higher than requested service rates of other mobile stations.

Such modifying may be advantageous, for example, when some mobile stations consistently request higher service rates that others. A consistently higher requested service rate might, for example, reflect a mobile station's more favorable transmitting and/or receiving conditions due perhaps to better radio frequency (RF) conditions associated with the mobile station. By dampening the effect of higher requested service rates, the system may achieve a smaller ratio between throughputs obtainable by mobile stations under favorable conditions versus those under less favorable conditions.

Figure 10:
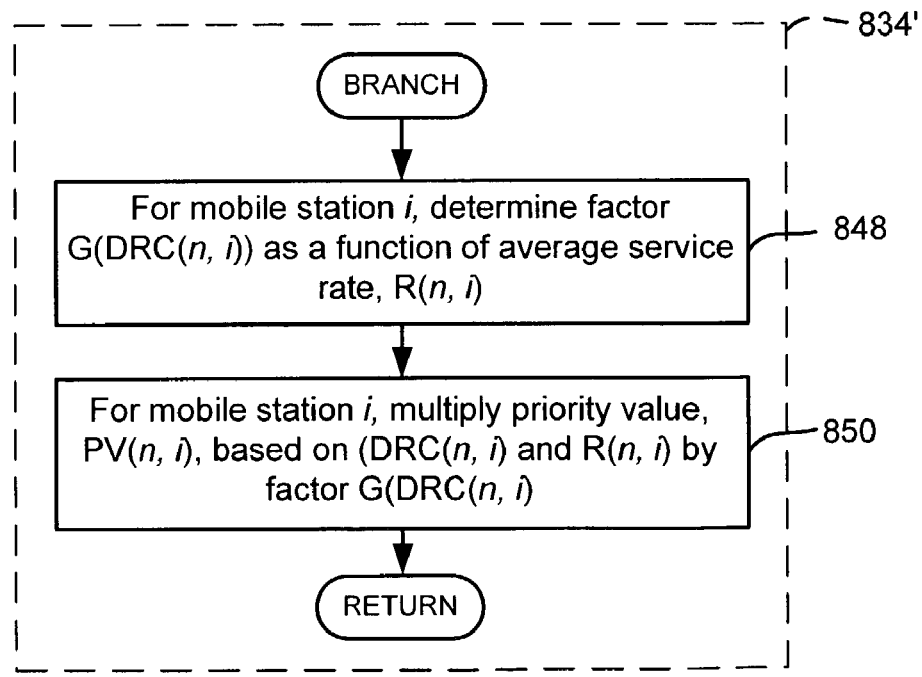
FIG. 10 is a flow chart of steps in accordance with an alternate embodiment of a portion of the flow chart of FIG. 8.

FIG. 10 is a flow chart of steps in accordance with an alternate embodiment of a portion of the flow chart of FIG. 8. In yet another embodiment, the communications system 700 may modify the priority value PV(n, i) of the i-th mobile station on the basis of the average service rate R(n, i) of the mobile station. Referring now to FIG. 10, modifying the priority value, PV(n, i), may include determining a factor, R(R(n, i)), at Block 848, wherein G is a function of the average service rate, R(n, i). The priority value, PV(n, i) may again be based on the requested service rate, DRC(n, i) and the average service rate R(n, i) of the i-th mobile station. At Block 850, the priority value may be modified by multiplying the priority value by the factor G(R(n, i)).

Therefore, if the factor varies inversely to the average service rate (e.g., [dG(R(n, i))]/dR(n, i)]<0 if G is continuous), multiplying the priority value PV(n, i) by the factor G (R(n, i) lowers the priority value when the average service rate of the i-th mobile station is higher than others and raises the priority value when the average service rate is lower than average service rates of other mobile stations. Again, it will be readily apparent to those skilled in the art that there are other multiplication factors, based on continuous or discrete functions, which can be employed to lower the priority value if the requested service rate is higher and to raise the priority value if the requested service rate is lower.

More generally, these factors can be employed, for example, to skew modified priority values in favor of mobile stations that have previously been allocated lower service rates and against those that previously have been allocated higher service rates. It will also be readily appreciated by those skilled in the art, the system 700 alternately can employ one or more factors stored, for example, in a look-up table, to raise or lower a priority value according to whether the requested service rate is lower or higher than others.

FIG. 11A is a flow chart is a flow chart of steps in accordance with yet a further alternate embodiment of a portion of the flow chart of FIG. 8. In still further embodiments, a priority value PV(n, i) of at least one mobile station 714A-714E of the communications system 700 can be additionally modified by a QoS parameter. According to one embodiment illustrated in FIG. 11A, at Block 834' the factor F(DRC(n, i) may be determined as previously described (Block 844). Additionally, a QoS parameter, X(i, j), may be determined for the i-th mobile station with respect to the n-th slot at Block 852. The factor F(DRC(n, i) may be modified by multiplying it by the parameter X(i, j) at Block 853. At Block 854, the priority value PV(n, i) of the i-th mobile station may be multiplied by the product of the factor F(DRC(n, i) and the QoS parameter, X(i, j), to thereby obtain a priority value modified by both the factor based on the requested service rate and the QoS parameter.

Figure 11B:
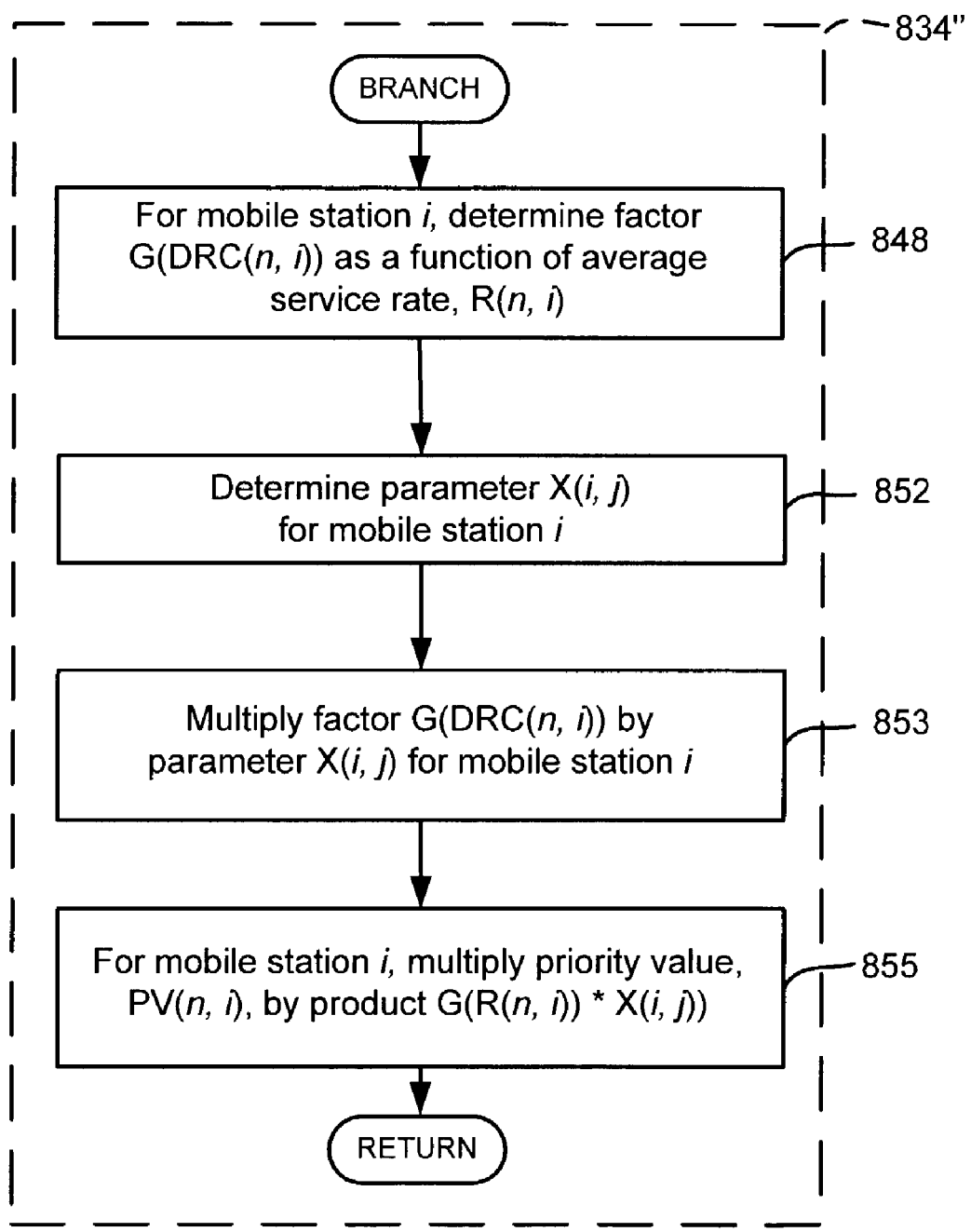
FIG. 11B is a flow chart is a flow chart of steps in accordance with yet a further alternate embodiment of a portion of the flow chart of FIG. 8.

FIG. 11B is a flow chart is a flow chart of steps in accordance with yet a further alternate embodiment of a portion of the flow chart of FIG. 8. In an alternate embodiment as illustrated in FIG. 11B, at Block 834'' the factor G(R(n, i) may be determined as previously described (Block 848), and the QoS parameter, X(i, j), may be determined for the i-th mobile station with respect to the n-th slot at Block 852 as also previously described. The QoS parameter may be used to modify the factor R(n, i) by illustratively obtaining the product of the parameter and the factor, namely, R(n, i)*X(i, j) at Block 853. The product so obtained may be used to modify the priority value PV(n, i) of the i-th mobile station at Block 855 by multiplying the priority value by the product of the factor R(n, i) and the QoS parameter, X(i, j). Accordingly, the priority value is modified by both the factor based on the average service rate and the QoS parameter.

As will be readily appreciated by those skilled in the art, the QoS parameter, X(i, j), for example, can be based on the payment scheme under which the base station 712 services the mobile station, i. Thus, for example, j may indicate one of several distinct classes based on payment scheme. The parameter X(i, j), therefore, can be selected so a mobile station under a preferred payment scheme has its priority value raised when modified by the parameter.

Alternately, the QoS parameter, X(i, j), can correspond to a priority class assigned to the i-th station. Still, moreover, the QoS parameter, X(i, j), can be based on the application for which the i-th mobile station is requesting a service rate, DRC(n, i), in the n-th slot. Thus, for example, with respect to X(i, j), j may indicate one of several distinct applications to be run in the n-th slot by mobile station i.

Figure 12:
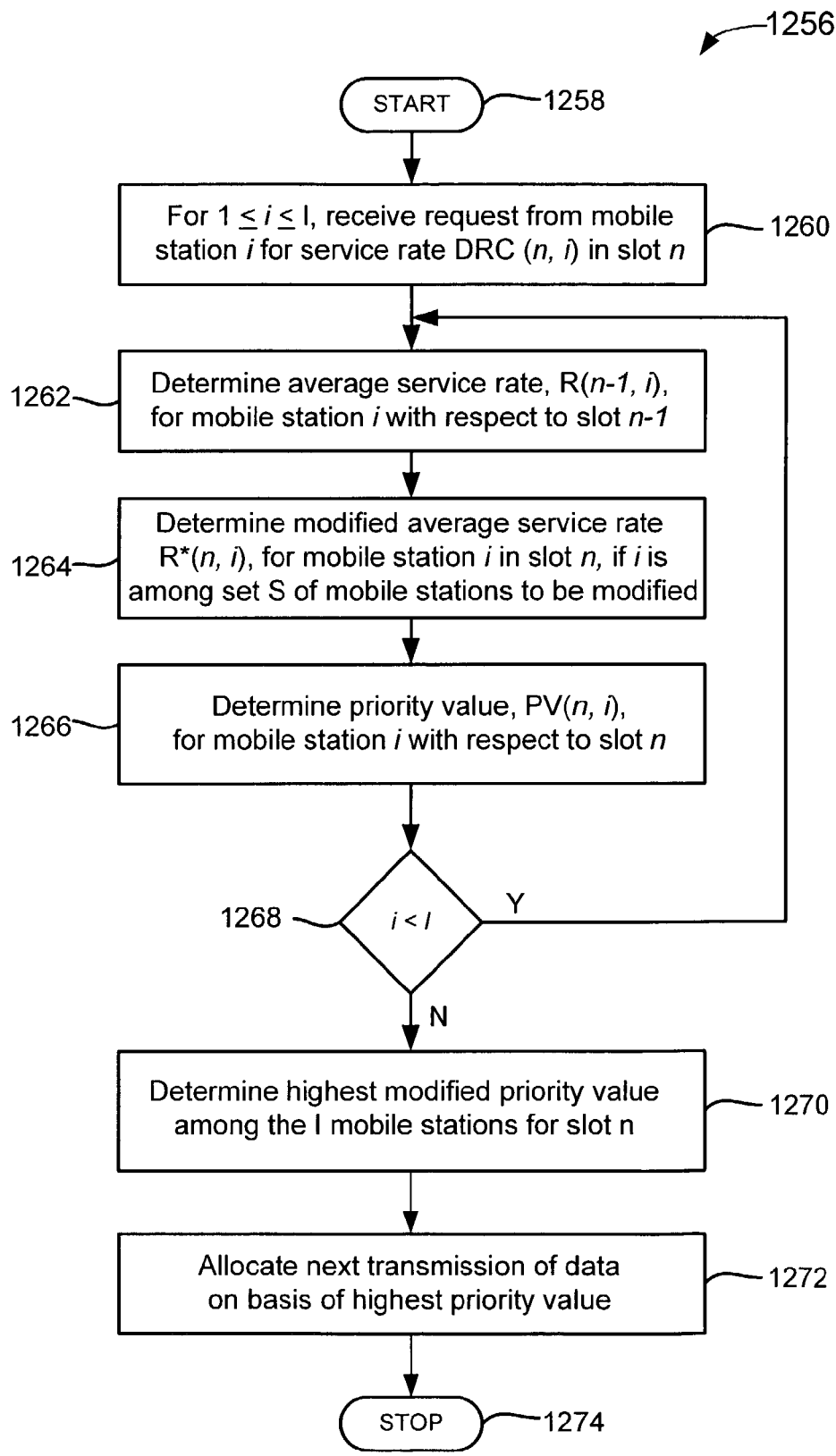
FIG. 12 is a flow chart illustrating a method in accordance with yet a further exemplary embodiment of the invention.
Figure 13:
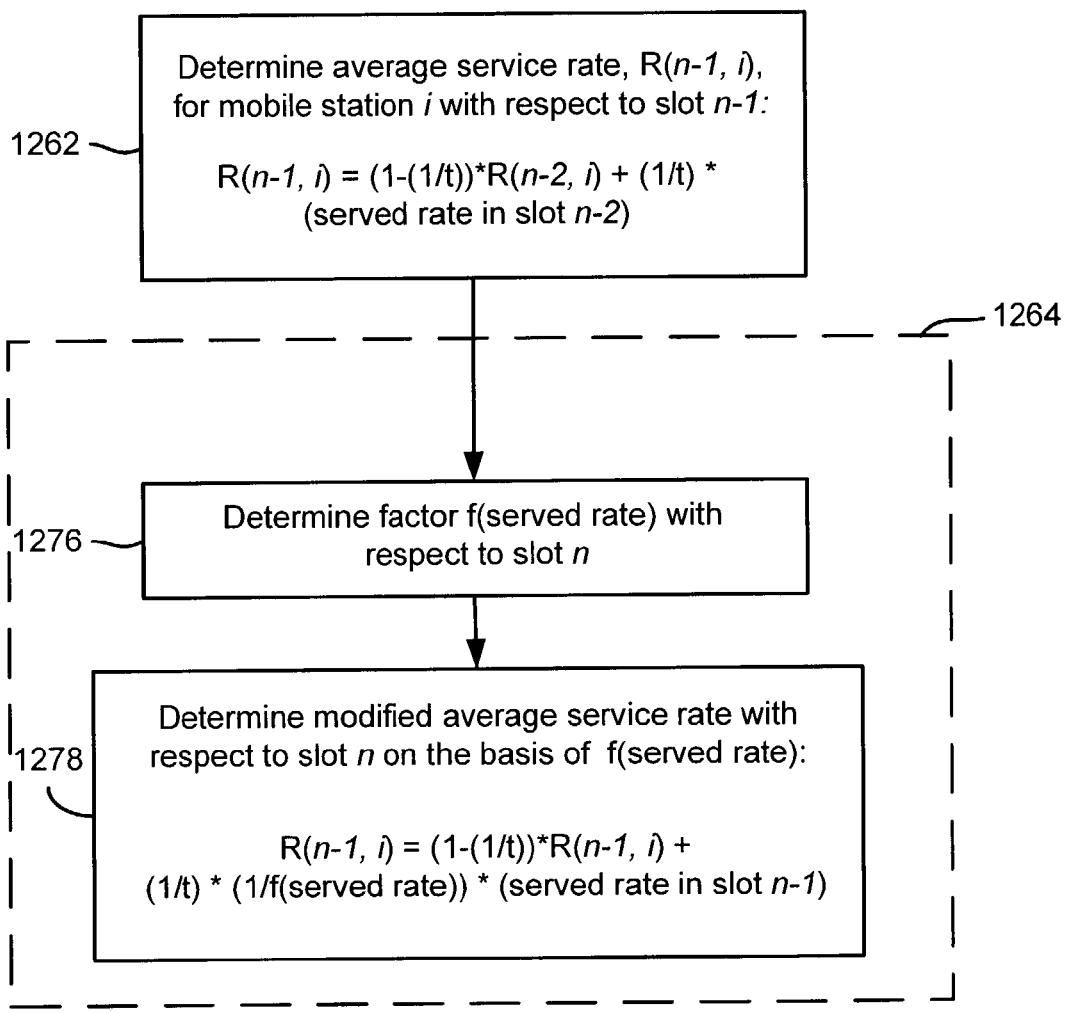
FIG. 13 is a flow chart is a flow chart of steps in accordance with yet a further alternate embodiment of a portion of the flow chart of FIG. 12.

FIG. 12 is a flow chart illustrating a method in accordance with yet a further exemplary embodiment of the invention, and FIG. 13 is a flow chart illustrating a further alternate embodiment of a portion of the flow chart of FIG. 12. Referring now to FIGS. 12 and 13, the priority value PV(n, i) for the i-th mobile station may be determined on the basis of a modified average service rate, $R^*(n, i)$. The priority value, as already noted, can be determined as a ratio of a requested service rate to an average service rate. Therefore, through modification of the average service rate, the communications system 700 can accordingly influence the priority value. The embodiment is described in terms of the flow chart 1256 in which, after the start (Block 58), the base station 712 receives at Block 1260 a request for service rate DRC(n, i) from the i-th station for the n-th slot. At Block 1262, the average service rate for service up to the next to last slot may be computed (i.e., R(n−1, i). A modified average service rate may then be computed at Block 1264 based on R(n−1, i) and an additional factor described in more detail as follows.

In general, an average service rate R(n, i) for the i-th mobile station in the n-th time slot can be calculated according to the following equation: $R(n, i)=(1-(1/t))*R(n-1, i)+(1/t)*$ (served rate in slot n−1 for user i), where t is the number of slots in a time window used for averaging. This formula is used at Block 1262 to compute, R(n−1, i), the average service rate with respect to the n−1 slot: $R(n-1, i)=(1-(1/t))*R(n-2, i)+(1/t)*$(served rate in slot n−2 for user i). The modified average service rate is then computed in Blocks 1276 and 1278.

At Block 1276, an additional factor f may be illustratively determined based on a past served rate determined over the averaging window (e.g., f(R(n, i))). At Block 1278, the modified average service rate, $R^*(n, i)$, with respect to slot n may then be determined based on the additional factor and R(n−1, i): $R^*(n, i)=(1-(1/t))*R(n-1, i)+(1/t)*(1/f(\text{served rate}))$ (served rate in slot n−1 for user i). The additional factor f can be chosen so that $R^*(n, i)$ is higher or lower according to whether the average service rate of the i-th mobile station has been higher or lower than average service rates of other mobile stations in the past. The choice may have an effect of raising or lowering the priority value according to whether the f varies directly or inversely with the average service rate. The additional factor f also can be further modified by a QoS parameter as described above.

Figure 14:
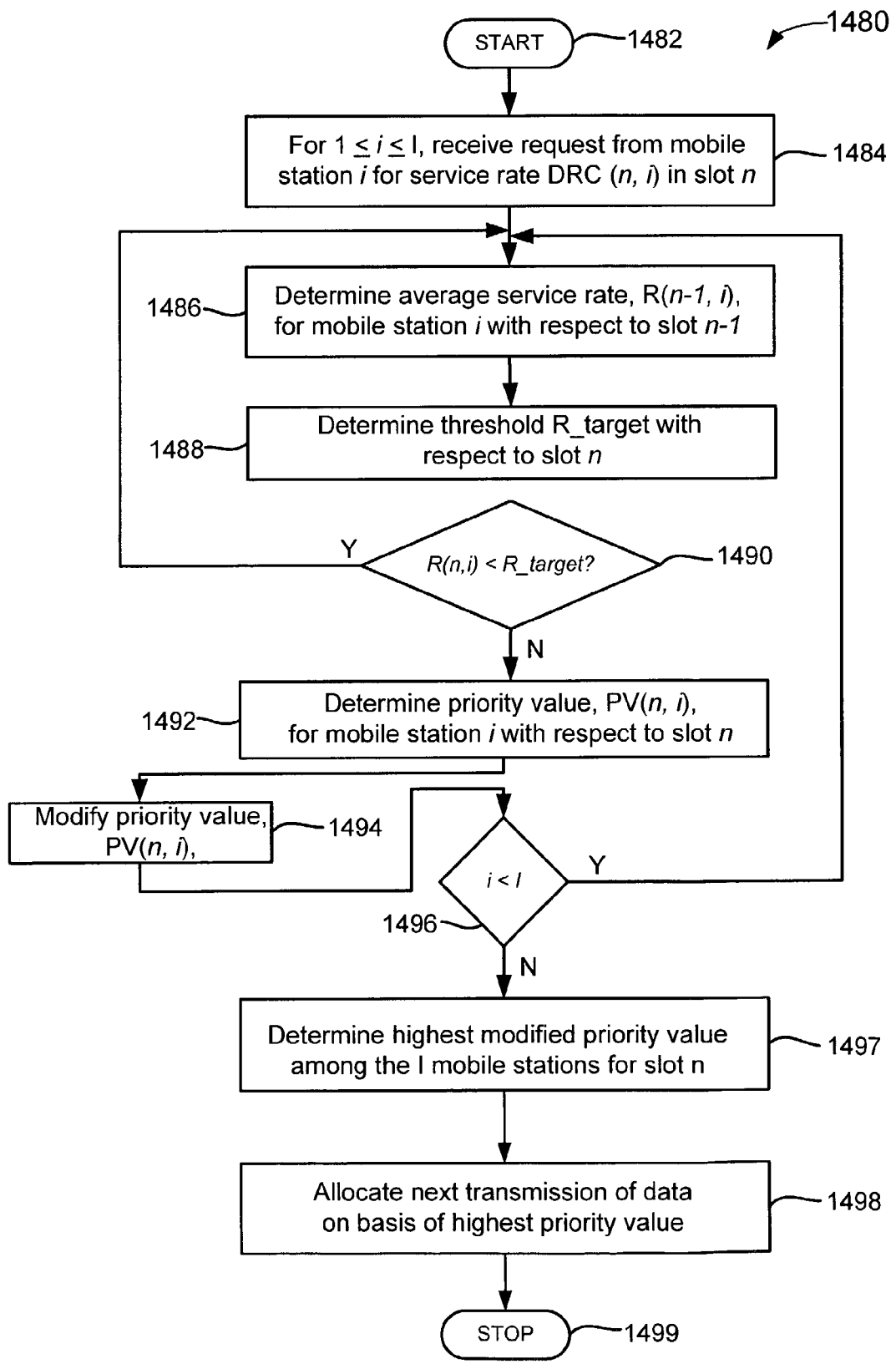
FIG. 14 is a flow chart illustrating a method in accordance with yet still a further exemplary embodiment of the invention.

FIG. 14 is a flow chart illustrating a method in accordance with yet still a further exemplary embodiment of the invention. In yet a further embodiment, only those mobile stations in the communications system 700 meeting a threshold condition are eligible for allocation of the next transmission of data. Allocation proceeds according to the flow chart 1480 illustrated in FIG. 14. After the start (Block 1482), a request for service from the i-th mobile station is received by the base station 712 (Block 1484). The average service rate R(n, i) for the i-th station is determined at Block 1486. At Block 1488, a threshold, R_target (e.g., $R_{Dtarget}$), is determined and at Block 1490 the average service rate and threshold are compared. Thee mobile station may be eligible for allocation of the next transmission of data if the average service rate is determined to be less than the threshold. For each mobile station determined to be eligible, a priority value PV(n, i) can be determined and modified (Blocks 1492, 1494, 1496, 1497). Accordingly, the next transmission of data can be allocated at Block 1498 based on the modified highest priority value, after which the scheduling operation is complete (Block 1499).

The average service rate R(n, i) may be updated for every mobile station even if a mobile station is excluded for consideration in the n-th slot. Therefore, for such an excluded mobile station, the average service rate, R(n, i), decreases from slot to slot if the earlier described formula is used in determining the average service rate. Thus, over time the excluded mobile station has an improved likelihood of being considered.

Additionally, the threshold can also be selected based on the total number of mobile stations. Thus, for example, if the threshold is selected so as to vary inversely with the number of users, there is accordingly a greater likelihood a mobile station will be considered the more mobile stations in the communications system 700.

Further, the threshold can be determined based on an average of all mobile station average service rates. For example, R_target can be computed as the summation of all average service rates over i divided by the total number, N, of mobile stations: $R\_target=[\Sigma R(n, i)]/N$. Alternately, or additionally, the threshold can be made to vary according to a QoS parameter. As already described, the QoS parameter may relate to the payment scheme under which service is provided to a mobile station, or, related to an application to be run on the mobile station.

Moreover, the threshold can be modified so as to take account of factors such as the transmission condition (e.g., RF condition) of each mobile station. For example, a modified threshold can be obtained by multiplying R_target by a factor K. If K is large compared to 1, for example, then mobile stations benefiting from better transmitting conditions are allocated greater throughput on average than other mobile stations. Thus, modifying the threshold by K has the effect of skewing the threshold in favor of mobile stations that have the benefit of transmitting conditions that are better than other mobile stations.

The invention being thus described, it will be obvious that the same may be varied in many ways. For example, the logical blocks in FIGS. 3 and 7 may be implemented in hardware and/or software. The hardware/software implementations may include a combination of processor(s) and article(s) of manufacture. The article(s) of manufacture may further include storage media, computer-readable media having code portions thereon that are read by a processor to perform the method, and executable computer program(s). The executable computer program(s) may include the instructions to perform the described operations in the method. The computer executable program(s) may also be provided as part of externally supplied propagated signal(s). Such variations are not to be regarded as departure from the spirit and scope of the invention, and all such modifications as would be obvious to one skilled in the art are intended to be included within the scope of the following claims.

We claim:

1. A method of scheduling a plurality of users by allocating transmitted data to the users performed by a scheduler, comprising the steps of:
   prioritizing, by the scheduler, the scheduling of the plurality of users for receiving transmitted data, including determining an average service rate for each user of the plurality of users, the average service rate being an arithmetic mean of a user's actual throughput over a time interval,
   determining, by the scheduler, a priority value for each user based upon a requested service rate of each user and the determined average service rate, and
   modifying, by the scheduler, at least one of the average service rate and the priority value for at least one user having an average service rate below a threshold, the threshold varying inversely with the number of users, said allocating transmitted data to the plurality of users performed based on at least one of the modified average service rate and modified priority value; and
   allocating, by the scheduler, a next data transmission among the plurality of users based on the prioritized scheduling.

2. The method of claim 1, wherein the modifying step further includes:
   modifying at least one of the average service rate and the priority value based on the requested service rate of the at least one user.

3. The method of claim 1, wherein the modifying step further includes:
   lowering the priority value if the requested service rate of the at least one user is higher than requested service rates of other users, and
   raising the priority value if the requested service rate is lower than requested service rates of other users.

4. The method of claim 1, wherein the modifying step further includes:
   modifying at least one of the average service rate and the priority value based on the average service rate of the at least one user.

5. The method of claim 1, wherein the modifying step further includes:
   lowering the priority value if the average service rate is higher than average service rates of other users, and
   raising the priority value if the average service rate is lower than average service rates of other users.

6. The method of claim 1, wherein the modifying step further includes:
   modifying at least one of the average service rate and the priority value based upon at least one quality-of-service (QoS) parameter.

7. A method of scheduling a plurality of users to receive transmitted data performed by a scheduler, comprising the steps of:
   calculating, by the scheduler, a function result based on the user perceived throughput of each user, the average user throughput, the maximum and the minimum user throughputs for each user, the function result based proportionally on the difference between an average user throughput over all active users and a user perceived throughput of each user, the average user throughput being an instantaneous arithmetic mean of all active actual user throughput, and
   prioritizing, by the scheduler, the scheduling of the plurality of users for receiving transmitted data based on comparing a current function result to previous function results.

8. The method of claim 7, wherein said step of prioritizing further includes:
   selecting a function from a group of more than one function for use in the calculating step based on a value of each user perceived throughput as compared to at least one of the average user throughput, the maximum user throughput, and the minimum user throughput for each user.

9. The method of claim 7, further comprising:
   computing, by the scheduler, said average user throughput dynamically.

10. The method of claim 7, wherein user perceived throughput of each user is configured so as to be within an operating range defined by a maximum user throughput for that user, and a minimum user throughput for that user.

11. The method of claim 10, wherein said step of prioritizing further includes:
    assigning a highest priority to a user whose actual throughput is below the minimum,
    assigning a next highest priority to a user whose user perceived throughput is greater than the minimum but below the average user throughput, and
    assigning lower priorities to users whose user perceived throughput is above the average user throughput or above the maximum of the operating range.

12. A method of scheduling a plurality of users to receive transmitted data performed by a scheduler, comprising the steps of:
    computing, by the scheduler, an average user throughput over all active users, the average user throughput being an instantaneous arithmetic mean of all active actual user throughput,
    calculating, by the scheduler, a function result for each user based proportionally on the difference between the computed average user throughput and a user perceived throughput of each user, and
    prioritizing, by the scheduler, the scheduling of the plurality of users for receiving transmitted data based on comparing a current function result to previous function results.

13. The method of claim 12, further comprising:
    computing, by the scheduler, said average user throughput dynamically.

14. The method of claim 12, wherein the user perceived throughput of each user is configured so as to be within an operating range defined by a maximum user throughput for that user, and a minimum user throughput for that user.

15. The method of claim 14, wherein said step of prioritizing further includes:
    assigning a highest priority to a user whose user perceived throughput is below the minimum,
    assigning a next highest priority to a user whose user perceived throughput is greater than the minimum but below the average user throughput, and
    assigning lower priorities to users whose user perceived throughput is above the average user throughput or above the maximum of the operating range.

16. The method of claim 14, wherein said step of prioritizing further includes:
    selecting a function from a group of more than one function for use in the calculating step based on a value of each user perceived throughput as compared to at least one of the average user throughput, the maximum user throughput, and the minimum user throughput for each user.

17. An apparatus for scheduling a plurality of users to receive transmitted data, comprising:

a filter for computing an average user throughput over all active users, the average user throughput being an instantaneous arithmetic mean of all active actual user throughput, and a prioritizer for prioritizing the scheduling of the plurality of users for receiving transmitted data based proportionally on the difference between the average user throughput over all active users and a user perceived throughput of each user, and based on a threshold varying inversely with the number of users.

18. The apparatus of claim 17, wherein said prioritizer further prioritizes the scheduling of the plurality of users based on a maximum user throughput for each user and a minimum user throughput for each user.

19. The apparatus of claim 17, wherein said prioritizer calculates a function result based on a user perceived throughput of each user, the average user throughput, a maximum user throughput and a minimum user throughput for each user; and prioritizes the scheduling of the plurality of users for receiving transmitted data based on the calculated function result.

20. The apparatus of claim 19, wherein the prioritizer schedules the plurality of users based on comparing a current function result to previous function results.

21. The apparatus of claim 17, wherein the user perceived throughput of each user is configured so as to be within an operating range defined by a maximum user throughput for that user, and a minimum user throughput for that user.

22. The apparatus of claim 21, wherein the prioritizer assigns a highest priority to a user whose user perceived throughput is below the minimum, assigns a next highest priority to a user whose user perceived throughput is greater than the minimum but below the average user throughput; and assigns lower priorities to users whose user perceived throughput is above the average user throughput or above the maximum of the operating range.

23. The apparatus of claim 21, wherein the prioritizer selects a function from a group of more than one function for use in prioritizing users based on a value of each user perceived throughput as compared to at least one of the average user throughput, the maximum user throughput, and the minimum user throughput for each user.

24. The apparatus of claim 17, wherein
the apparatus is part of a base station, and
the apparatus outputs user identifying information informing the base station to transmit data in a current timeslot to the identified user.

25. The apparatus of claim 24, wherein the user identifying information includes a user ID and a user priority.

26. A method of scheduling a plurality of users for allocating transmitted data to the users performed by a scheduler, comprising the steps of:

determining, by the scheduler, an average service rate for each user of the plurality of users, the average service rate being an arithmetic mean of a user's actual throughput over a time interval, determining, by the scheduler, a priority value for each user based upon a requested service rate of each user and the determined average service rate, and modifying, by the scheduler, at least one of the average service rate and the priority value for at least one user having an average service rate below a threshold to control an allocation of transmitted data to the users, the threshold varying inversely with the number of users.

27. The method of claim 26, wherein the modifying step further includes:

modifying at least one of the average service rate and the priority value based on the requested service rate of the at least one user.

28. The method of claim 26, wherein the modifying step further includes:

lowering the priority value if the requested service rate of the at least one user is higher than requested service rates of other users, and raising the priority value if the requested service rate is lower than requested service rates of other users.

29. The method of claim 26, wherein the modifying step further includes:

modifying at least one of the average service rate and the priority value based on the average service rate of the at least one user.

30. The method of claim 26, wherein the modifying step further includes:

lowering the priority value if the average service rate is higher than average service rates of other users, and raising the priority value if the average service rate is lower than average service rates of other users.

31. The method of claim 26, wherein the modifying step further includes:

modifying at least one of the average service rate and the priority value based upon at least one quality-of-service (QoS) parameter.

32. A method of scheduling a plurality of users to allocate transmitted data to the users performed by a scheduler, comprising the steps of:

determining, by the scheduler, a modified average service rate for each of the plurality of users, the modified average service rate being based upon an average service rate of the user, the average service rate being an arithmetic mean of a user's actual throughput over a time interval, determining, by the scheduler, a priority value for at least one user based upon the modified average service rate, a requested service rate of the at least one user, and a threshold varying inversely with the number of users, determining, by the scheduler, which user of the plurality of users has a highest priority value, and allocating, by the scheduler, a next transmission of data based on the highest priority value.

33. A method of scheduling a plurality of users to allocate transmitted data to the users performed by a scheduler, comprising the steps of:

determining, by the scheduler, an average service rate for each of the plurality of users, the average service rate being an arithmetic mean of a user's actual throughput over a time interval, comparing, by the scheduler, the average service rate of each user against a threshold, the threshold varying inversely with the number of users; and determining, by the scheduler, whether a user is eligible for allocation of a next transmission of data based on the comparing step.

34. The method of claim 33, further comprising:

determining, by the scheduler, the threshold based on an average of all user average service rates.

35. The method of claim 33, further comprising:

determining, by the scheduler, the threshold based on at least one quality-of-service (QoS) parameter.

36. The method of claim 35, wherein the QoS parameter relates to one or more of a payment scheme under which service is provided to a user, and an application that is run on the user.

37. The method of claim 33, further comprising:
modifying, by the scheduler, the selected threshold based on a transmission condition of each user.

38. The method of claim 37, wherein the step of modifying the selected threshold further includes:
skewing the threshold in favor of users that have the benefit of transmitting conditions that are better than other users.

* * * * *